Figure 1:
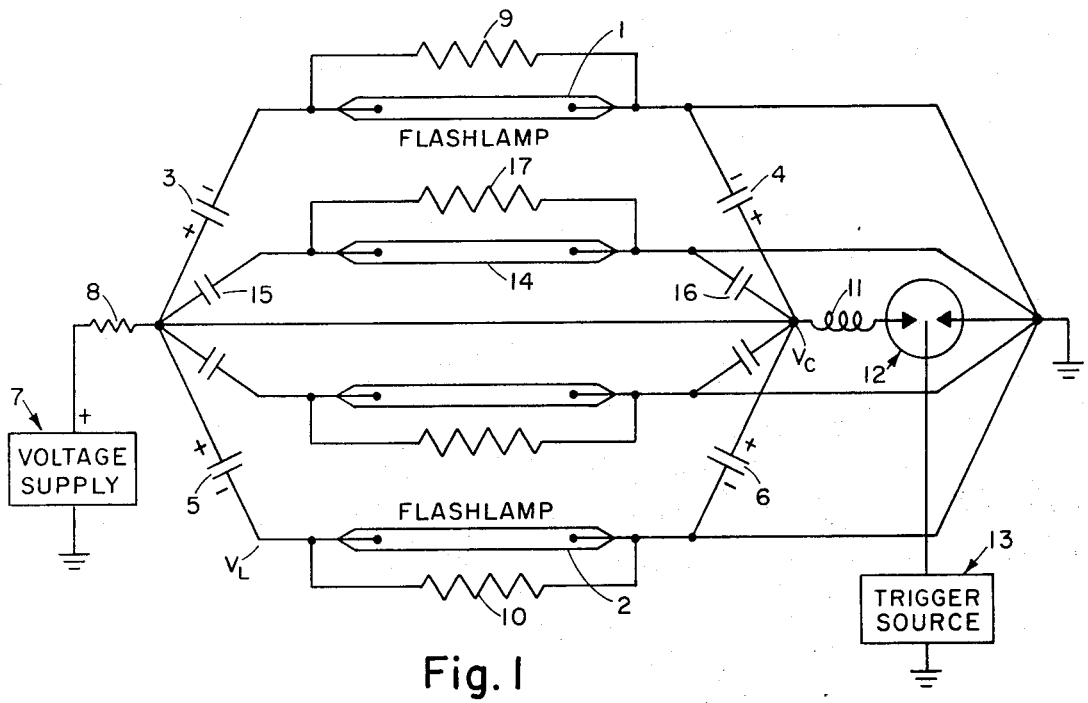

United States Patent [19]
Mack et al.

[11] 3,725,733
[45] Apr. 3, 1973

[54] ULTRAFAST MULTIPLE FLASHLAMP

[75] Inventors: Michael E. Mack, Vernon, Conn.; Robert J. Mongeon, East Longmeadow, Mass.

[73] Assignee: The United States of America as represented by the Secretary of the Navy

[22] Filed: Apr. 19, 1971

[21] Appl. No.: 135,280

[52] U.S. Cl. ...............315/228, 315/230, 315/237, 315/244, 315/289
[51] Int. Cl. ............................................H05b 37/00
[58] Field of Search ......307/110; 315/228, 230, 237, 315/242, 244, 245, 289

[56] References Cited

UNITED STATES PATENTS 3,544,840  12/1970  Saiger.............................315/289 X
3,480,876  11/1969  Barbini..........................315/94.5 P Primary Examiner—Roy Lake
Assistant Examiner—Lawrence J. Dahl
Attorney—R. S. Sciascia and L. I. Shrago

[57] ABSTRACT

There is disclosed a control system for firing a plurality of flashlamps so as to produce high intensity light pulses with ultrafast rise times for pumping laser systems wherein a resonant circuit is utilized to develop maximum voltage across the flashlamps at a time corresponding to their breakdown delay time.

4 Claims, 3 Drawing Figures

PATENTED APR 3 1973 3,725,733

Michael E. Mack
Robert J. Mongeon
INVENTORS

BY *M Shugo*
Attorney

ULTRAFAST MULTIPLE FLASHLAMP

The invention described herein may be manufactured and used by or for the Government of the United States of America for governmental purposes without the payment of any royalties thereon or therefor.

The present invention relates generally to high intensity illumination systems and, more particularly, to an arrangement for producing high intensity light pulses with ultrafast rise times for pumping laser systems.

There are numerous techniques available for optically pumping laser mediums. One common arrangement involves the use of a helical flashlamp which is dimensioned so as to extend over the effective length of the medium. As is well known, however, any flashlamp has a certain maximum energy input, and any input in excess of this level will result in the destruction of the lamp. Thus, if the laser system requires an input greater than this explosion limit, a multiplicity of such flashlamps must be utilized. Moreover, if the flashlamp is operated in a mode wherein the current density of the arc exceeds a certain level, the lamp will be, in effect, "pinched" by the resulting high magnetic fields that are present at this current density. If this occurs, the filamentary discharge which results causes a relatively high inductance to appear which slows down the rise time of the discharge and the light pulse. In the case of dye lasers, the pumping light must not only have a high energy level but, additionally, this maximum energy must be attained in an extremely short time interval. This requirement of high intensity and ultrashort rise time necessitates a number of lamps as the pumping source.

For most fast rise time light pulse applications, open discharge lamps designed with short arc lengths are used. This construction results in a low inductance and a fast deionization time. However, the relatively small size of the arc and its open condition makes this type of light source unsatisfactory for laser pumping. More effective for this purpose are the so-called "capillary lamps" where the discharge is confined to the bore of a quartz capillary, perhaps an inch or so long. In laser applications, these lamps can be conveniently arranged, for example, in a cylindrical configuration, about the material which is to be radiatively pumped.

It is accordingly a primary object of the present invention to provide an arrangement for producing high intensity light pulses which possess an ultrafast rise time.

Another object of the present invention is to provide a system for firing several lamps simultaneously so as to generate a high intensity light signal which has a fast rise time.

A still further object of the present invention is to provide an optical pumping system for a dye laser in which a multiplicity of capillary lamps are simultaneously fired and wherein the triggering element which controls this firing does not detract from the peak current through the capillary lamps.

Figure 2:
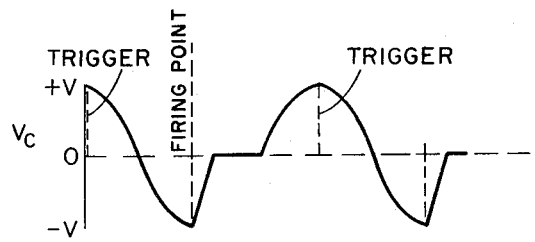
Figure 3:
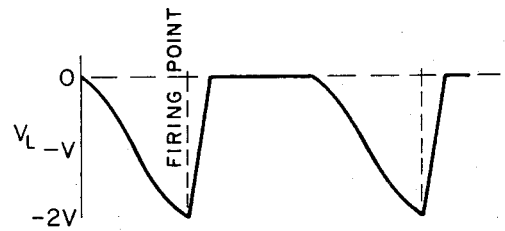

Other objects, advantages and novel features of the invention will become apparent from the following detailed description of the invention when considered in conjunction with the accompanying drawings wherein:

FIG. 1 is a schematic diagram illustrating an arrangement according to the present invention for simultaneously firing a multiplicity of flashlamps which pump a dye laser; and FIGS. 2 and 3 are voltage wave forms appearing in the circuit which are helpful in explaining its operation.

Referring now to FIG. 1, which shows an arrangement for simultaneously firing a plurality of capillary flashlamps, such as 1 and 2, it will be seen that each of these lamps is connected at opposite ends through a capacitor, 3 and 4 in the case of flashlamp 1, and 5 and 6 in the case of flashlamp 2, to the positive terminal of a DC voltage supply 7 through a charging resistor 8. The other side of this power supply is grounded. Directly across flashlamp 1 is a relatively high resistor 9, and a similar resistor 10 is across flashlamp 2.

Connected across both capacitors 4 and 6 is the series combination of an inductor 11 and a switching device 12 controlled from a trigger source 13. This switching device may be, for example, a thyratron or a spark gap which is normally in an open condition and is rapidly switched to a closed condition by the appearance of a trigger pulse from source 13.

It would be pointed out that the magnitude of inductor 11 is chosen so that the ringing frequency of this element and its series capacitors 4 and 6 corresponds to the breakdown delay time of the flashlamps. If this relationship is observed, the flashlamps will be fired, as will be seen hereinafter, after a half cycle of this frequency when the voltage condition across both lamps is at a maximum. Thus, nearly all of the energy which is stored in the system will be immediately dissipated in the excitation of the flashlamps and, consequently, maximum light intensity will be produced.

It would be noted that the breakdown delay time is essentially statistical, with the probability of this breakdown occurring during a finite interval of time being dependent upon the magnitude of the voltage across the lamp, the electrode material, the gas pressure and the residual gas ionization. For a given electrode configuration and gas composition, the delay time between when the gap is overvoltaged and the initiation of a discharge is a direct consequence of the statistics and for modest overvoltages might lie anywhere from tens to hundreds of nanoseconds. This delay can be minimized by increasing the voltage pre-ionizing the gas and proper electrode selection. With these three parameters fixed, the voltage must be present for a sufficiently long time to insure breakdown. Hence, the maximum resonance frequency of the discharge circuit must be designed with this consideration in mind.

The operation of the circuit of FIG. 1 is as follows:
In the standby condition, that is, with switch 12 open, capacitors 3 and 5 are charged to the level of voltage supply 7, $V_c$, through resistor 8 and resistors 9 and 10, respectively. Likewise, capacitors 4 and 6 are similarly charged to the same level through resistor 8 only. The voltage across the flashlamps, as perhaps best seen in FIG. 3, is therefore zero, and the voltage $V_c$ across each capacitor corresponds to the voltage supply source 7 and is positive.

If a trigger pulse is now generated by source 13 and applied to switching device 12, firing this switch and changing it to a low impedance element, capacitors 4 and 6 immediately start to discharge through this switch and inductor 11. Although there is also a discharge path at this time for capacitors 3 and 5, this path includes resistors 9 and 10 and, because of their relatively high resistance value, no significant discharge takes place. Thus, the voltage across capacitors 3 and 5 remain substantially equal to $V_c$.

As perhaps best shown in FIG. 2, the voltage $V_c$ across capacitors 4 and 6 now decreases rapidly to zero. Thereafter, because of the action of inductor 11, which has the effect of continuing to maintain current flow in the discharge circuit in the same direction, capacitors 4 and 6 are recharged back nearly to their original voltage level but with a reversed polarity. The voltage, consequently, across each flashlamp is now a maximum, equal to twice the value of the voltage supply 7, as shown in FIG. 3, and both flashlamps now fire simultaneously. More specifically, the energy in capacitors 3 and 4 discharges through flashlamp 1 and that accumulated in capacitors 5 and 6, through flashlamp 2.

As mentioned hereinbefore, the magnitude of inductor 11 and capacitors 4 and 6 are chosen so their resonant frequency matches the breakdown time delay of the flashlamps. Thus, the maximum voltage available in the system, approximately 2 $V_c$, appears across the flashlamps at the appropriate time. In this connection, since inductor 11 and its associated capacitors behave as a ringing circuit, the voltage across the flashlamps reaches a maximum level at the end of the first half cycle. Thereafter, as is well known, this voltage steadily decreases in successive cycles. Thus, most efficient operation is realized where the firing occurs at the end of the first half cycle. The maximum energy available in the capacitor banks is consequently dissipated in each flashlamp, producing a light signal of maximum intensity.

The cycle of operation can be repeated by opening switching device 12 by any suitable means, not shown. When this occurs, it will be appreciated, the system, that is, capacitors 3, 4, 5 and 6, again charge to their standby condition.

The system of FIG. 1 differs from some of the conventional arrangements in that the switching device 12 is not in series with the flashlamps. Because of this, the peak current through flashlamps 1 and 2 is not limited in any way by the internal impedance of this switching device when it is activated by the triggering source. Thus, maximum light emission from each flashlamp is achievable. Also, the design and construction of the over-all system is simplified to a certain extent since the switching device is not in the high frequency section of the circuit, that is, the discharge path of each flashlamp.

It would be pointed out, in connection with the circuit of FIG. 1, that the ringing frequency can be modified according to the characteristics of the flashlamps so as to have one-half the period thereof equal to the breakdown delay time of these lamps.

It will be understood that additional flashlamps, such as 14, may be readily added to the system and all that is necessary in this regard is to add associated capacitors, such as 15 and 16, resistor 17, plus a connection to the remote side of the switching mechanism 12. If the individual flashlamps are arranged in a cylindrical configuration, for example, a limit is reached when the diameter of the cylinder becomes large enough so that the UV and RF coupling across opposite lamps is reduced to the point where simultaneous firing of these lamps no longer occurs. All of the lamps in such a situation will eventually fire, but the peak output energy will be degraded somewhat by a triggering jitter condition. It should, of course, be recognized that the firing of the lamps occurs in a manner such that each lamp contributes to the firing of an adjacent lamp because of the UV and RF coupling present. This RF energy is intrinsic to the transient nature of the rapid interchange of the large stored capacitive energy in the system and its transfer to the distributed and lumped circuit inductances. As a natural consequence of this interchange, a finite amount of RF energy is radiated and conducted to the surrounding environment which includes the neighboring flashlamps. In addition to this RF energy which is simultaneously coupled to all nearby lamps, the UV photons liberated at the trigger source and at the first lamp to fire will, with the appropriate system geometry, also couple to the remaining flashlamps. Thus, the essentially simultaneous presence of RF energy and UV photons aid in pre-ionizing any nontriggered flashlamp, thereby greatly enhancing the probability of its discharge.

Although the circuit described hereinbefore has been disclosed as having particular application for optically pumping dye lasers, it may be used in connection with other optical systems. For example, with high pressure lamps, the long fluorescence which follows the discharge is quenched so that not only is the rise time short but also the pulse duration. In one embodiment of the present invention, a 10-nanosecond rise time and a 30-nanosecond duration was obtained with an input of two Joules to two capillary flashlamps pressurized to one atmosphere. Such a flashlamp may be used in high-speed photographic studies. Additionally, the basic circuit can find application for fast rise time pumping of electrical discharge lasers where the individual lamps, of course, are replaced by the electrodes in the discharge tube.

What is claimed is:

1. Apparatus for producing high intensity light pulses with ultrafast rise times comprising, in combination,
   a plurality of gaseous discharge lamps;
   a resistor connected across each lamp;
   a pair of capacitors connected in an electrical series relationship across each of said lamps;
   a source of DC supply voltage having one side connected to a reference potential and the other side connected to the junction of each pair of capacitors;
   means for connecting one side of each lamp to said reference potential whereby each of said capacitors is initially charged to a voltage level corresponding to the magnitude of said DC supply source; and
   an inductance and a switching device in series between the junction of each pair of capacitors and said reference potential whereby whenever said switching device is triggered to a low impedance condition both of said capacitors commence to discharge, with one of said capacitors discharging at a low rate because its discharge path includes said resistor, and the other capacitor rapidly discharging and thereafter being reversibly charged so that the voltage across each discharge lamp increases to approximately twice the magnitude of said DC supply source and each lamp is fired.

2. In an arrangement as defined in claim 1 wherein the magnitude of said inductance and the magnitude of that capacitor of said pair which rapidly discharges when said switching device is triggered to a low impedance condition are such that the resonant frequency thereof corresponds to the ionization delay time of the gas discharge lamps.

3. In an arrangement as defined in claim 1 wherein said switching device is a gas discharge tube that is fired by a trigger pulse and the radiation produced contributes to the pre-ionization of the gas in the gas discharge lamps.

4. In an arrangement as defined in claim 1 wherein all of said plurality of said gas discharge lamps are arranged in a cylindrical configuration so as to accommodate a lasing medium.

* * * * *